United States Patent
Saito et al.

[11] 3,825,715
[45] July 23, 1974

[54] PROCESS FOR CONTROLLING ELECTRICAL DISCHARGE SHAPING

[75] Inventors: Nagao Saito; Kazuhiko Kobayashi, both of Nagoya; Shigeru Takagi, Kasugai, all of Japan

[73] Assignee: Mitsubishi Denki Kabushiki Kaisha, Chiyoda-ku, Japan

[22] Filed: May 29, 1973

[21] Appl. No.: 364,420

[52] U.S. Cl. ............ 219/69 M, 219/69 C, 219/69 P
[51] Int. Cl. .................................. B23k 9/16
[58] Field of Search..... 219/69 G, 69 M, 69 P, 69 C

[56] References Cited
UNITED STATES PATENTS
| | | | |
|---|---|---|---|
| 3,655,937 | 4/1972 | Ullmann et al. | 219/69 P |
| 3,705,286 | 12/1972 | Kondo et al. | 219/69 G X |
| 3,705,287 | 12/1972 | Saito et al. | 219/69 P |

Primary Examiner—E. A. Goldberg
Assistant Examiner—Hugh D. Jaeger
Attorney, Agent, or Firm—Oblon, Fisher, Spivak, McClelland & Maier

[57] ABSTRACT

A process for electrical discharge shaping a workpiece by impressing a pulse voltage across a working gap between the workpiece and an electrode, wherein a waveform of the pulse is controlled by effectively discharging the pulse. The working gap is controlled, so as to contribute to stable processing, depending upon the controlled pulse waveform. A pulse time width is divided into three intervals. When the discharge is formed during the first time interval the electrode movement is controlled to increase the working gap. When the discharge is formed during the second time interval, the electrode movement is controlled to maintain the working gap. When the discharge is formed during the third time interval or no discharge is generated, the electrode movement is controlled to decrease the working gap.

8 Claims, 10 Drawing Figures

PROCESS FOR CONTROLLING ELECTRICAL DISCHARGE SHAPING

BACKGROUND OF THE INVENTION

1. Field of the Invention

This invention relates to a process for controlling a working gap by impressing a pulse voltage across a gap between the workpiece and an electrode to cause a discharge which results in an electrical discharge shaping, and more particularly to a process for controlling the pulse waveform thereby controlling the width of the working gap.

2. Description of the Prior Art

FIG. 1 illustrates a well-known prior art apparatus utilized for shaping a workpiece by means of electrical discharges applied across a working gap. The electrical discharge circuit originates a pulse which is impressed across a working gap formed by a workpiece 5 and an electrode 4. Electric current from a DC power source 1 is fed to a switching transistor 2. A pulse current is fed to the working gap formed between the workpiece 5 and the electrode 4 through a resistor 3 by operating the switching transistor. The switching frequency of the transistor 2 is controlled by a signal from the control circuit 6.

The width of the working gap is controlled by a servo mechanism comprising a hydraulic cylinder 7 and a servo valve 8 for controlling the oil volume so that the width of the gap remains constant. A control voltage e(V), corresponding to the electrode voltage (the voltage between electrode 4 and workpiece 5), is compared with a reference voltage $E_o(V)$ and is controlled such that the difference between the voltages is zero. The reference numerals 9 and 10 designate resistors for dividing the electrode voltage, 11 designates a condenser forming a filter and 12 designates a variable resistor for adjusting the servo sensitivity.

The electrode voltage waveforms and the discharge current waveforms in the embodiment of FIG. 1 are usually as shown in FIG. 2. FIG. 2a plots the waveform V of the electrode voltage versus time t, and FIG. 2b plots the waveform i of the discharge current versus time t. The electrode voltage waveform 13 shows the case wherein a pulse voltage impressed across the working gap discharges after certain delay $t_1$; waveform 14 shows the case wherein the pulse voltage discharges without any delay; and waveform 15 illustrates the case of no discharge. The discharge current waveforms corresponding to the electrode voltage waveforms 13 and 14 are shown in FIG. 2b as 16 and 17, respectively.

An attendant disadvantage with respect to the waveforms shown in FIG. 2 is that the discharge current pulse time (pulse width) is not constant due to various factors affected by the working gap conditions. Accordingly, various processing characteristics such as the electrode consumption ratio, the roughness of the discharge-shaped surface, etc., are disadvantageously affected because of the varying pulse width.

In the electric circuit of FIG. 1, the control voltage e corresponding to the average electrode voltage is given by the following equation:

$$e = \frac{k}{t}\int^t V dt \quad (1)$$

wherein $k = a$ constant given by the ratio of voltages divided by the resistors 9 and 10; and $V =$ the electrode voltage shown in FIG. 2a.

As applied to the waveforms shown in FIG. 2a and b, equation 1 can be rewritten as follows:

$$e = k \cdot \frac{V_0 \cdot t_1 + V_g \cdot t_2}{t_1 + t_2 + t_3}$$

$$= k \cdot \frac{V_0 \cdot \dfrac{t_1}{t_1 + t_2} + V_g \cdot \dfrac{t_2}{t_1 + t_2}}{1 + \dfrac{t_3}{t_1 + t_2}} \quad (2)$$

wherein $t_1$, $t_2$ and $t_3$ represent average times.

As is clear from equation 2, the control voltage e is dependent upon the electrode voltage pulse width ($t_1 + t_2$) and the quiescent time $t_3$. Accordingly, when these conditions are changed, it is necessary to change the reference voltage $E_o$. When the quiescent time $t_3$ is much larger than the voltage pulse length ($t_1 + t_2$), the control voltage e becomes very small, so that sometimes the working gap cannot be properly controlled. These relations are shown in FIG. 3, wherein the control voltage e is varied within the shaded region depending upon the values of $t_1$, $t_2$ and $t_3$.

As stated above, when the workpiece is processed by an electrode voltage waveform as shown in FIG. 2, the processing characteristics, e.g. the electrode consumption and the roughness of the discharge-shaped surface, are disadvantageously affected. When the working gap is controlled by the average electrode voltage, a desirable stabilized control is hard to achieve.

A method has been proposed of impressing a high voltage impulse 18 as shown in FIG. 4, impulse 18 being higher than the pulse voltage in the working gap for improving the processing characteristics. In said method, it has been found that the voltage waveforms 19 and 20 are formed during the discharge, and the waveform 21 is formed during no discharge, so that the pulse width of the current waveforms can be easily held constant and accordingly, the processing characteristics such as the electrode consumption and the roughness of the discharge-shaped surface are advantageously improved.

However, the problem of the control of the working gap has not been allieviated. Especially when the quiescent time is long, the average electrode voltage is extremely low, and accordingly, it remains quite difficult to control the working gap.

Comparing the cases illustrated in FIGS. 2 and 4, a substantial difference has been found in the relationship between the working gap and the average electrode voltage. It will be presumed that the pulse width of the voltage impulse 18 of FIG. 4 is quite narrow compared with the entire pulse width, and the average electrode voltage value is insignificant. Then the relation between the working gap d and the average electrode voltage V is shown by the curve 22 of FIG. 5 when using the pulse waveform of FIG. 2. The relationship between d and V is not clear and is easily changed depending upon the conditions of the working gap. However, in general, d increases as V increases. When the high voltage impulse of FIG. 4 is superimposed, the discharge can be caused from a wider working gap as compared to that of FIG. 2. In brief, the relation of the curve 23 may be applied to the curve 22.

Accordingly, even though a workpiece is processed by a constant reference voltage, the working gap changes. If one proceeds without any change in the working gap, various disadvantages occur. Processing with a wide working gap is sometimes good and sometimes disadvantageous; however, it is sometimes necessary to use it for the purpose of the processing.

SUMMARY OF THE INVENTION

Accordingly, it is an object of the present invention to provide a process for electrical discharge shaping a workpiece by impressing a pulse voltage across working gap between the workpiece and an electrode wherein the working gap is effectively controlled, depending upon a controlled pulse waveform, to provide stable processing.

The foregoing and other objects are attained in accordance with one aspect of the present invention through the provision of a process for controlling an electrical discharge shaping which comprises dividing the processing pulse voltage into three time intervals and detecting the discharge during each interval. A predetermined voltage, being higher than the arc voltage, is impressed across the working gap during the first time interval. Another voltage, being higher than or equal to the first voltage, is impressed across the gap during the second time interval and a third predetermined voltage is similarly impressed, being equal to or higher than the voltage during the second time interval at the beginning thereof and being equal to or lower than the predetermined voltage during the first time interval thereafter. These voltages control the movement of the electrode, so as to increase, decrease or maintain the working gap. The actual signals for moving the electrode are obtained from processing the detected signal through a logic circuit. In accordance with the process of this invention, processing characteristics, e.g. the electrode consumption ratio and the roughness of the discharge-shaped surface, are greatly improved to reduce disadvantages of the prior art which found it difficult to control the working gap.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF A PREFERRED EMBODIMENT

The process of the present invention controls a working gap by using a pulse waveform that is substantially unaffected by the time factor ($t_1 + t_2$) and quiescent time $t_3$ of the pulse waveform for improving the processing characteristics.

Figure 6:
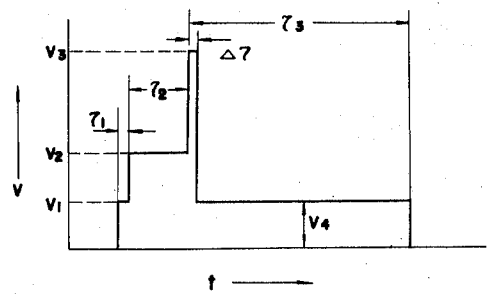
FIG. 6 is a waveform of a voltage pulse impressed across the working gap according to the present invention.

Referring now to the drawings, wherein like reference numerals designate identical or corresponding parts throughout the several views, and more particularly to FIG. 6 thereof, a waveform of the voltage pulse impressed between the electrodes is illustrated according to this invention. The waveform is time-divided into three intervals, each having a different voltage amplitude. The voltage is varied as shown in FIG. 6, wherein the voltage amplitude is $V_1$ in the first time interval $\tau_1$, the voltage is $V_2$ in the second time interval $\tau_2$, and the voltage is $V_3$ for a relatively short time $\Delta\tau$ and is decreased to $V_4$ thereafter in the third time interval $\tau_3$. The voltages $V_1$, $V_2$ and $V_3$ are respectively higher than the arc voltage and are on the order of $V_1 \leq V_2 \leq V_3$. The voltage $V_4$ is preferably $V_4 \leq V_1$, and in some cases $V_4 = 0$.

Figure 7:
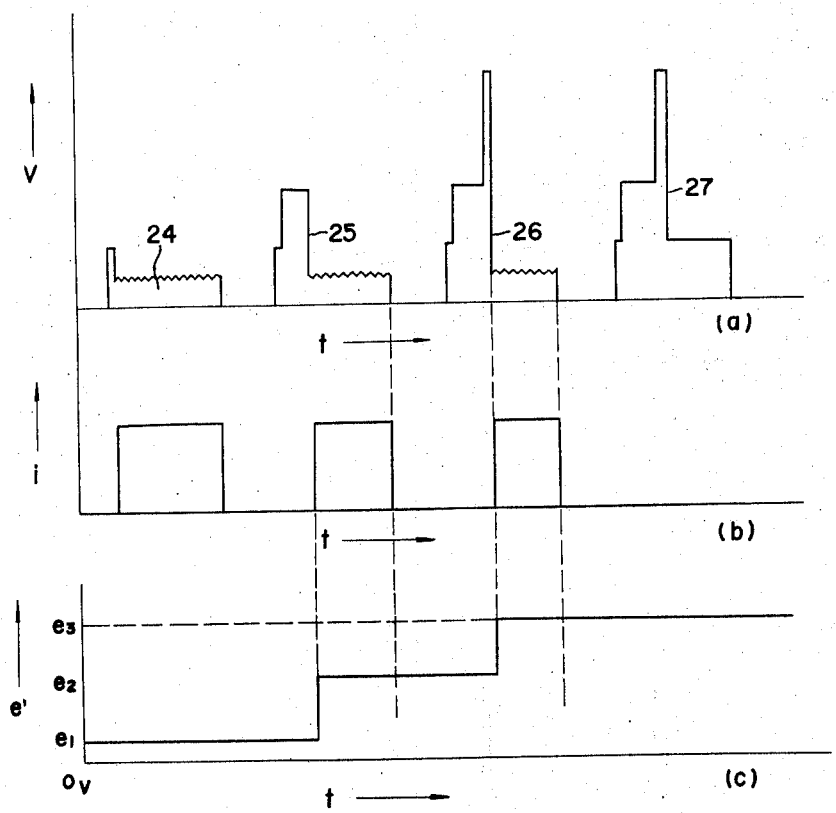
FIG. 7 is a waveform of one embodiment forming the electrode voltage waveform and the current waveform according to this invention.

The principle and operation of processing by impressing the voltage pulse of FIG. 6 in the working gap will now be illustrated with reference to FIG. 7. FIG. 7a illustrates a pulse waveform of the electrode voltage, FIG. 7b illustrates a pulse current waveform thereof, and FIG. 7c illustrates a control signal for controlling the width of the working gap. The relationship between the voltage waveforms 24, 25, 26 and 27 which are applied across the working gap and the control signal $e'$ are, for example, given as follows:

| Beginning of discharge | electrode voltage waveform | Control signal $e'(V)$ |
|---|---|---|
| First time interval | 24 | $e_1$ lift up signal |
| Second time interval | 25 | $e_2$ stay signal |
| Third time interval | 26 | $e_3$ push down signal |
| No discharge | 27 | $e_3$ push down signal |

The control signal $e'$ during the quiescent time is the voltage ($e_1$, $e_2$ or $e_3$) elected at the time the pulse is impressed.

When the discharge is formed during the first time interval the impressed voltage will be the lowest and the discharge will be formed without substantial delay after impressing the voltage. Accordingly, this implies that the working gap is narrow or the insulation of the insulating fluid in the working gap has not recovered. In such a condition, the electrode is controlled to increase the working gap by lifting-up the electrode.

When the discharge is formed during the second time interval, the discharge will be formed at the higher voltage $V_2$ after a certain delay. Accordingly, this implies that the working gap is kept at a suitable distance and the insulation of the insulating fluid has satisfactorily recovered. It is preferable to control the working gap so as to maintain this condition for as long a time as possible (electrode quiescent operation).

When the discharge is formed during the third time interval, or if no discharge is formed, it is presumed that the working gap is too wide in comparison with the above two cases. It is thus preferable to control the working gap by decreasing it (electrode push-down operation).

The impulse of high voltage $V_3$, having a relatively narrow pulse width $\Delta \tau$, is impressed at the beginning of the third time interval, whereby the efficiency of the pulse discharge is increased by compulsorily discharging under high voltage even though the working gap is relatively wide. Even when discharge is not formed by the high voltage impulse, the possibility of a discharge is decreased under the low voltage $V_4$ after the impulse ceases. Accordingly, it is a main object to improve the processing characteristics by preventing current having an extremely narrow pulse width. Moreover, a bridge caused by impulse discharge accumulation at the discharging part of the working gap can be prevented so that the processing condition is advantageously stabilized.

As stated above, the working gap is positively controlled so as to discharge during the second time interval. Moreover, the possibility of a discharge under the low voltage $V_4$ in the third time interval is quite small. Accordingly, it is seldom that the pulse width of the discharge current pulse will be shorter than $\tau_3$ of FIG. 6. Accordingly, if $(\tau_1 + \tau_2)$ is smaller than the total voltage pulse width $(\tau_1 + \tau_2 + \tau_3)$, one can consider that the discharge current pulse width is substantially constant. Accordingly, the processing characteristics, e.g. the comsumption of the electrode and the roughness of the discharge-shaped surface caused by a nonuniform current pulse width, can be substantially improved. The effect is even more significant when $V_4 = 0$ in FIG. 6.

Another advantage according to this invention is to eliminate the difficulties pertaining to a change in the working gap and an inoperativity of control as dependent upon the conditions of the quiescent time and the voltage pulse width, as found in the conventional process. As it is clear from FIGS. 6 and 7, the control signal $e_1$ is applied when the working gap condition is detected during the time of the beginning of the pulse ($\tau_1 + \tau_2$), and the gap condition is maintained during the third time interval or the quiescent time. Accordingly, the control of the working gap is not substantially changed by the quiescent time, total voltage pulse width or the high voltage impulse, so that stable processing can be attained.

Figure 1:
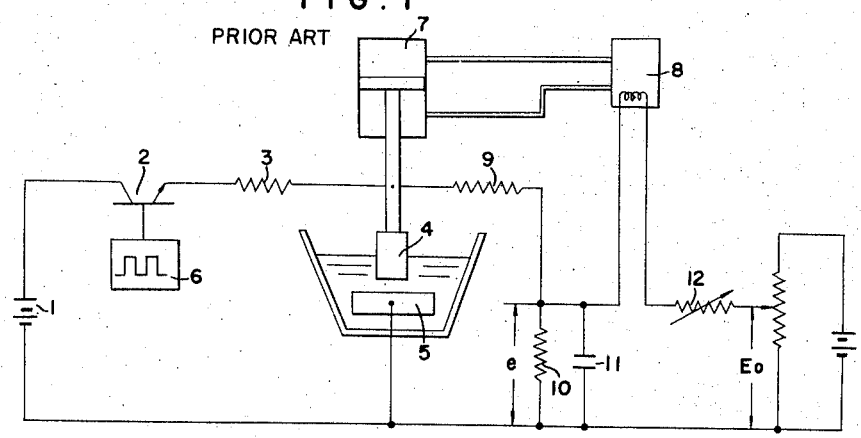
FIG. 1 is a schematic diagram of a prior art apparatus for shaping a workpiece through electrical discharges by applying a controlled pulse in a working gap.
Figure 2:
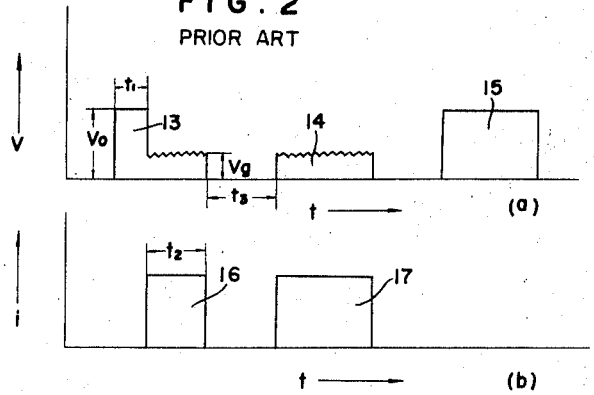
FIG. 2 is an electrode voltage waveform and current waveform of the prior art process of FIG. 1.
Figure 3:
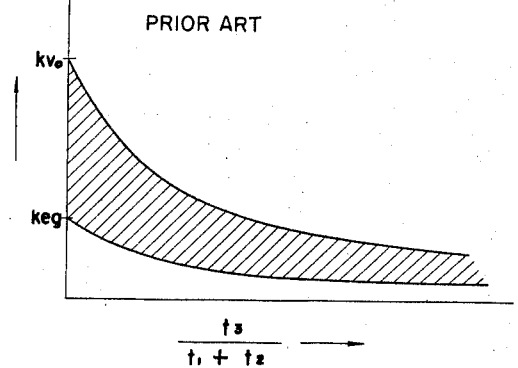
FIG. 3 is a graph characteristic of the conditions affecting the control voltage of the working gap shown in FIG. 2.
Figure 4:
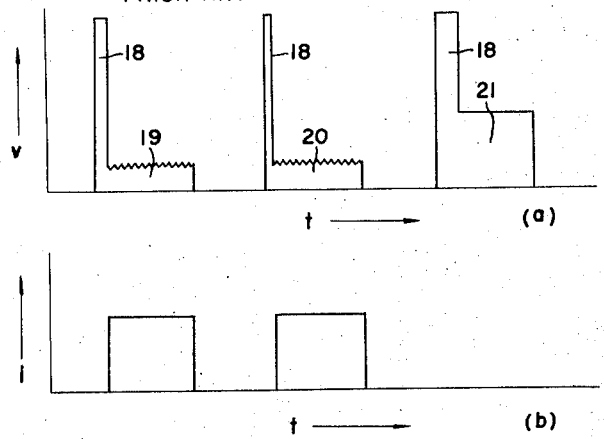
FIG. 4 is an electrode voltage waveform illustrative of another prior art process.
Figure 5:
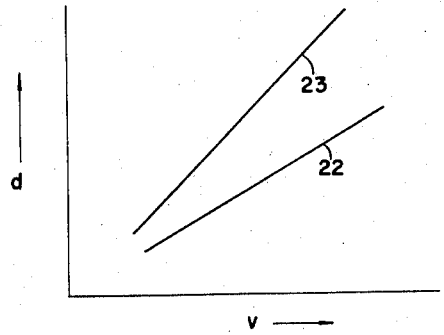
FIG. 5 is a characteristic graph for comparing the average electrode voltage with the working gap of the waveforms in FIGS. 2 and 4.
Figure 8:
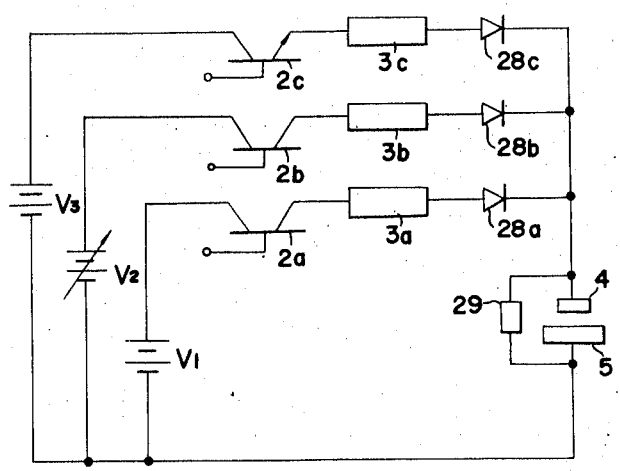
FIG. 8 is a circuit for forming the electrode voltage waveform and the current waveform of FIG. 7.

The apparatus for originating the voltage pulse shown in FIG. 6 is illustrated in FIG. 8 wherein $V_1$, $V_2$ and $V_3$ designate DC power sources having voltages $V_1$, $V_2$ and $V_3$; the reference numerals 2a, 2b and 2c designate transistors having the same characteristics as that shown in FIG. 1; 3a, 3b and 3c designate resistors having the same value as that shown in FIG. 1; 28a, 28b and 28c designate diodes for protecting the transistor against damage caused by a reverse current; and 29 designates a resistor for preventing a complete open condition across the working gap.

In operation, the transistor 2a is turned on, and after $\tau_1$ seconds the transistor 2b is turned on for $\tau_2$ seconds. The transistor 2c is then turned on for $\Delta \tau$ seconds, and after $\tau_3$ seconds the transistor 2a is turned off, so that a voltage pulse having the same waveform as shown in FIG. 6 can be formed in the working gap. Only the current passing from DC power source $V_1$ to the transistor 2a contributes to the electrical discharge-shaping. The DC power sources $V_2$ and $V_3$ are only used for applying relatively high voltages in the working gap when no discharge is formed therein. The electric current from sources $V_2$ and $V_3$ are significantly lower than the current from the DC power source $V_1$, and accordingly, the resistance of the resistors 3b and 3c are usually higher than that of the resistor 3a. During the discharge, the transistors 2b and 2c are preferably turned off for the same reason.

When the voltage $V_1$ is impressed across the working gap by turning on the transistor 2a, whereby the discharge is formed within $\tau_1$ seconds, the transistors 2b and 2c are not turned on. However, when the discharge is not formed, the transistor 2b is turned on. When the discharge is not formed within $\tau_2$ seconds, the transistor 2c is turned on. The transistors are turned on depending upon the discharge condition in the previous time interval. In such a case, when the discharge is formed after turning on the transistor 2b or 2c, it is possible to inhibit an increase in the discharge pulse current caused by turning on the transistors 2b or 2c to a negligible degree.

Moreover, as stated above, during the three time intervals, when the discharge is not formed in the working gap, regardless of the presence of the high voltage impulse, and when it is considered unnecessary to impress the voltage $V_4$ in the working gap due to a sufficient width of the working gap, it is possible to turn off the transistor 2a after impressing the impulse (to turn on the transistor 2c for $\Delta \tau$ seconds). In such a case, the discharge during the third time interval completely disappears, so that it is no trouble to decrease the current pulse width less than $\tau_3$ seconds.

In a preferred embodiment example, the values in FIG. 6 can be given as follows:
$V_1 = V_4 = 80$ volts
$V_2 = 80 - 300$ volts
$V_3 = 300$ volts The time intervals $\tau_2$ and $\tau_3$ are varied with the condition that $$\tau_1 + \tau_2/\tau_1 + \tau_2 + \tau_3 \leq \tfrac{1}{4},$$

wherein the first time interval is given as $$\tau_1 \leq 1-2 \ \mu s.$$

For example, in the case of $$\tau_1 + \tau_2 + \tau_3 = 100 \ \mu s, \text{ and}$$

$\tau_1 + \tau_2/\tau_1 + \tau_2 + \tau_3 = \tfrac{1}{4}$, each time interval is as follows:

$$\tau_2 = 25 \ \mu s; \text{ and } \tau_3 = 75 \ \mu s.$$

In the above embodiment, the voltage $V_2$ impressed during the second time interval is variable.

A stable discharge shaping can be attained in the process which utilizes a relatively narrow working gap, such as in finish processing or fine processing, by utilizing the phenomenon that the working gap can be increased by increasing the voltage. When the processing characteristics are deteriorated by increasing the working gap in a rough processing, it is preferable to impress a low voltage. Accordingly, the voltage can be set to a desirable relatively low voltage. In the FIG. 6 and FIG. 8 embodiment, the voltage change in the second time interval was accomplished in one step. However, it is possible to change the voltage in several steps without any technical difficulty. It can be accomplished by increasing the number of the transistors in the circuit of FIG. 8 and by turning on the transistors progressively for a predetermined interval.

Figure 9:
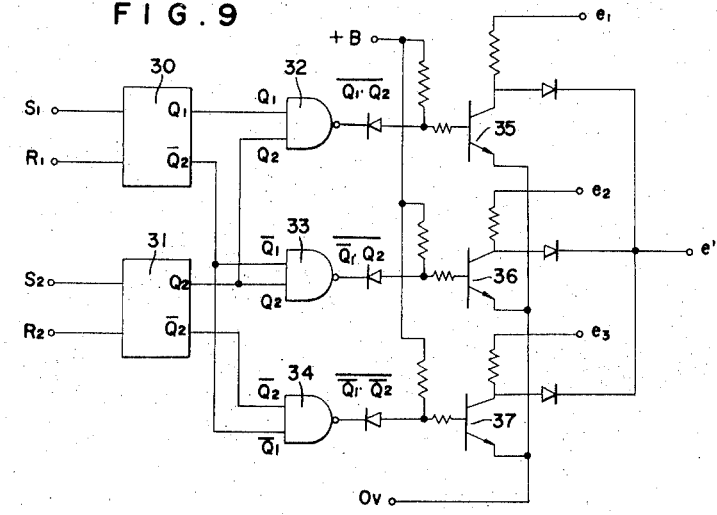
FIGS. 9 and 10 are a circuit and its corresponding waveform, respectively, of the embodiment for detecting the working gap control voltage shown in FIG. 7.

Referring now to FIG. 9, a logic circuit is illustrated for generating the control signal $e'$ for controlling the working gap, wherein the reference numerals 30 and 31 respectively designate R-S flip-flop elements operated with input signals $S_1 \cdot R_1$ and $S_2 \cdot R_2$, and the reference numerals 32, 33 and 34 are NAND circuit elements. The transistors 35, 36 and 37 are respectively switched by the outputs of NAND gates 32, 33 and 34. More than one of the transistors are not turned off at the same time, and only one transistor is turned off (the other two transistors are turned on), so that the control signal $e'$ is one of the values of $e_1$, $e_2$, or $e_3$, wherein $S_1 \cdot R_1$ and $S_2 \cdot R_2$ are signals originated as shown in FIG. 10.

Figure 10:
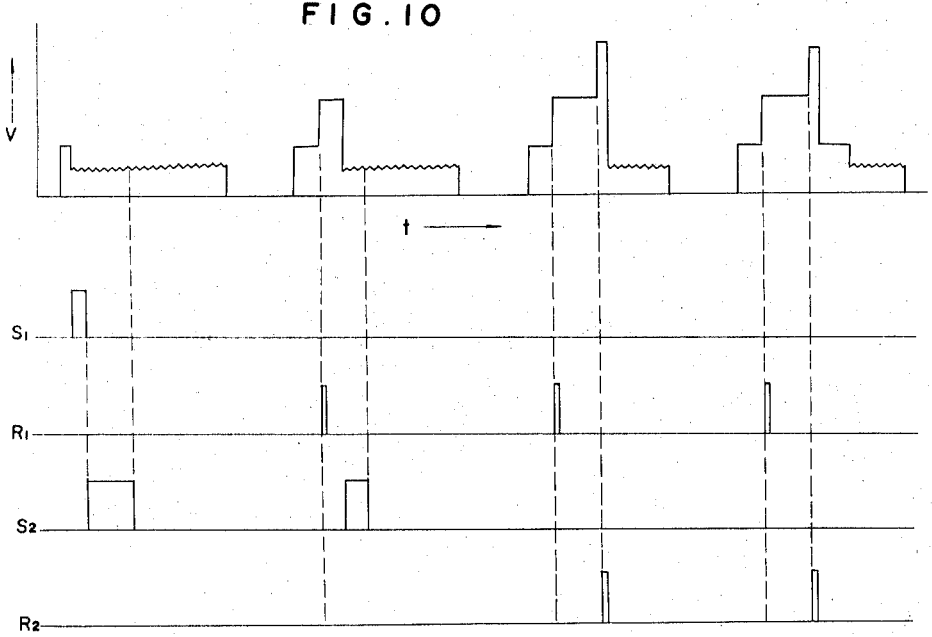

In FIG. 10, it is seen that when the discharge is formed during the first time interval, $S_1 = 1$; when the discharge is formed during the second time interval, $S_2 = 1$; and when no discharge is formed, $R_1 = 1$ and $R_2 = 1$. The values of $e_1$, $e_2$ and $e_3$ in the above example are $e_1 = 0$, $e_2 = 6$ volts, and $e_3 = 2$ volts, which are relatively low because of the logic circuit. The reference voltage (corresponding to $E_0$ in FIG. 1) is used for control so as to discharge during the second time interval. Accordingly, the reference voltage is set at about 6 volts. Incidentally, the control signal $e'$ is changed in a step fashion as seen in FIG. 7. It is possible to adjust the waveform of the control signal by passing it through a filter comprising a resistor and a condenser or a reactor, the same as with a conventional control circuit.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by letters patent of the United States is:

1. In a process for controlling an electrical discharge shaping by a discharge caused by impressing a controlled pulse voltage between an electrode and a workpiece, an improvement which comprises the steps of: generating a controlled pulse voltage having first, second and third time intervals, having first, second, third and fourth predetermined amplitudes; controlling the movement of said electrode by increasing the working gap when said discharge is formed during the predetermined first time interval; controlling the movement of said electrode to maintain the working gap when said discharge is formed during the predetermined second time interval; and controlling the movement of said electrode to decrease said working gap when said discharge is formed during the predetermined third time interval or if no discharge is formed.

2. The process for controlling an electrical discharge shaping according to claim 1, which further comprises: impressing a voltage having said first amplitude, being higher than the arc voltage, across said working gap during said first time interval; impressing a voltage having said second amplitude, being equal to or higher than said first amplitude, during said second time interval; impressing a voltage having said third amplitude, being equal to or higher than said second amplitude at the time of the beginning of said third time interval; and impressing a voltage having said fourth amplitude, being equal to or lower than said first amplitude, to prevent a discharge thereafter.

3. The process for controlling an electrical discharge shaping according to claim 1, wherein the relationship between said first time interval $\tau_1$, said second time interval $\tau_2$, and said third time interval $\tau_3$ is $$\tau_1 + \tau_2/\tau_1 + \tau_2 + \tau_3 \leq \tfrac{1}{4}$$

4. The process for controlling an electrical discharge shaping according to claim 2, wherein: a first power source for generating a voltage having said first amplitude is connected in series to the working gap through a first switching transistor; a second power source for generating a voltage having said second amplitude is connected in series to the working gap through a second switching transistor and is also connected in parallel with said first switching transistor and said first power source; a third power source for generating a voltage having said third amplitude is connected in series to the working gap through a third switching transistor and is also connected in parallel with said first and second switching transistors and with said first and second power sources; and wherein said first switching transistor is turned on, and after said first time interval said second switching transistor is turned on for said second time interval and after said first and second time intervals, said third switching transistor is turned on for a predetermined time $\Delta\tau$, and after said third time interval said first switching transistor is turned off.

5. The process for controlling an electrical discharge shaping according to claim 4, wherein: said second switching transistor is turned on only when no discharge is formed during said first time interval after turning on said first switching transistor; and said third switching transistor is turned on only when no discharge is formed during said second time interval after turning on said second switching transistor.

6. The process for controlling an electrical discharge shaping according to claim 4, wherein said first switching transistor is turned off after said predetermined time $\Delta\tau$ when no discharge is formed by turning on said third switching transistor for the time $\Delta\tau$.

7. The process for controlling an electrical discharge shaping according to claim 2, wherein said second voltage amplitude impressed across said working gap during said second time interval may vary while said first, third and fourth voltage amplitudes remain the same.

8. The process for controlling an electrical discharge shaping according to claim 1, which further comprises a logic circuit for originating a signal for controlling the movement of said electrode by receiving a signal that shows whether said discharge is formed during said first, second or third time intervals.

* * * * *